United States Patent [19]
Feldhausen et al.

[11] Patent Number: 5,591,362
[45] Date of Patent: Jan. 7, 1997

[54] IDLE SOLENOID FOR ENGINE DRIVEN WELDER

[75] Inventors: Joseph E. Feldhausen; Jeffery P. Schroeder, both of Appleton, Wis.

[73] Assignee: The Miller Group, Ltd., Appleton, Wis.

[21] Appl. No.: 383,728

[22] Filed: Feb. 3, 1995

[51] Int. Cl.$^6$ ................................................ B23K 9/00
[52] U.S. Cl. ........................................ 219/133; 290/40 B
[58] Field of Search .................... 290/40 B; 361/160, 361/170, 194; 219/130.31, 130.32, 133, 134

[56] References Cited

U.S. PATENT DOCUMENTS

| | | | |
|---|---|---|---|
| 2,227,486 | 1/1941 | Campbell | 219/133 |
| 2,508,719 | 5/1950 | Kern | 290/40 R |
| 2,804,552 | 8/1957 | McFarland | 219/133 |
| 2,804,553 | 8/1957 | McFarland | 219/133 |
| 2,809,300 | 10/1957 | McFarland | 219/133 |
| 3,082,353 | 3/1963 | Cohen et al. | 290/40 B |
| 3,597,623 | 8/1971 | Gilardi | 290/40 B |
| 3,612,892 | 10/1971 | Nobile et al. | 290/40 B |

OTHER PUBLICATIONS

Owner's Manual Form OM–431G (May 1994) for the Bobcat™ 225G Welder.

*Primary Examiner*—Clifford C. Shaw
*Attorney, Agent, or Firm*—Mark W. Croll; Thomas W. Buckman; John P. O'Brien

[57] ABSTRACT

An idle solenoid assembly sets the idle speed of the internal combustion engine of a self-contained welding machine. The idle solenoid assembly comprises a bracket to which a solenoid is immovably secured. The solenoid plunger is connected to the engine governor arm. The bracket has slotted feet that slide on an engine surface. By sliding the bracket, the position of the engine governor arm is adjusted to produce the desired engine idle speed when the solenoid is actuated. There is no contact or binding between the bracket and the solenoid plunger or between the solenoid plunger and the engine governor arm. The solenoid is wired to a control circuit through a first plug retained in the bracket and a second plug. The solenoid is properly grounded on the internal combustion engine through the second plug.

9 Claims, 3 Drawing Sheets

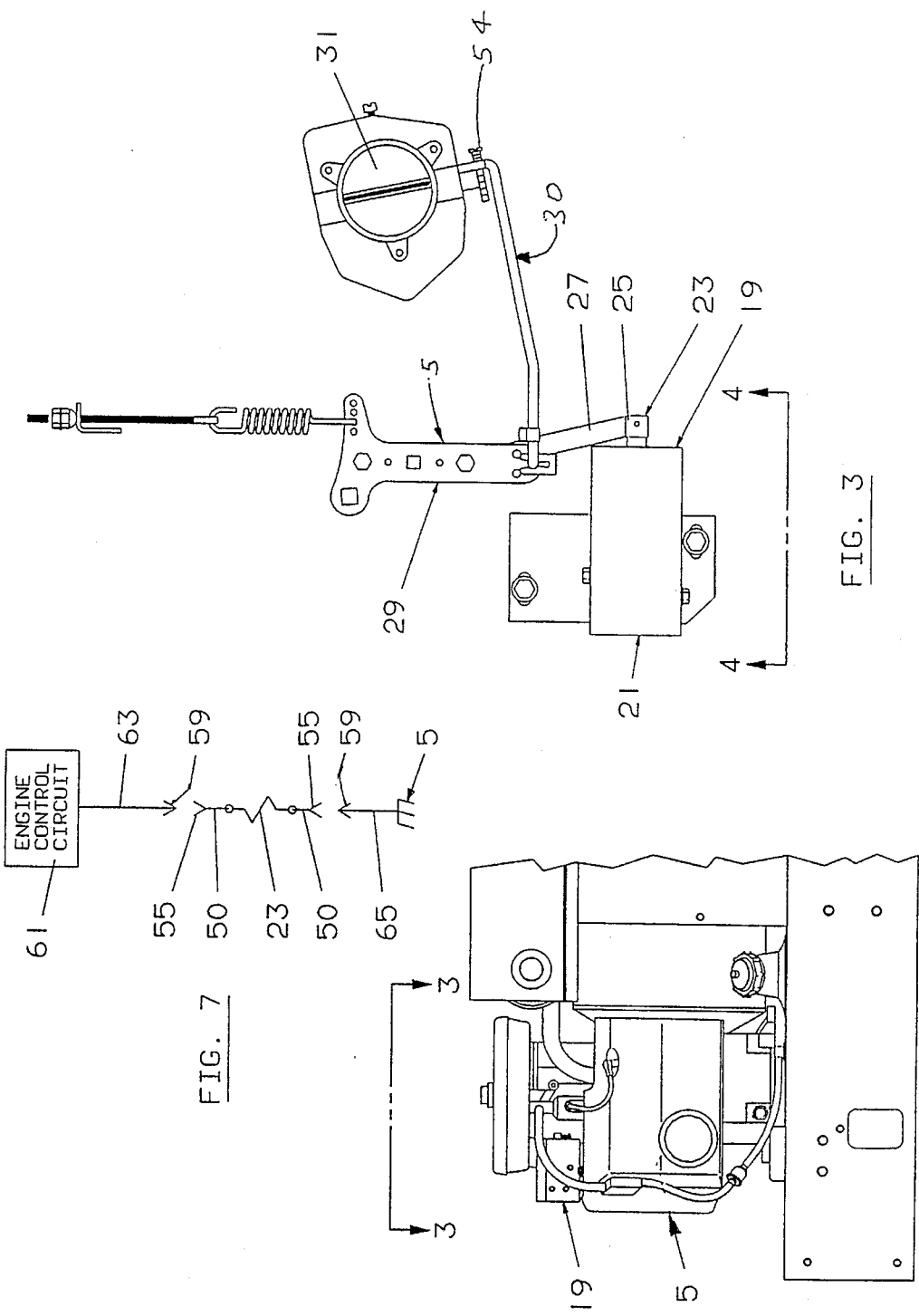

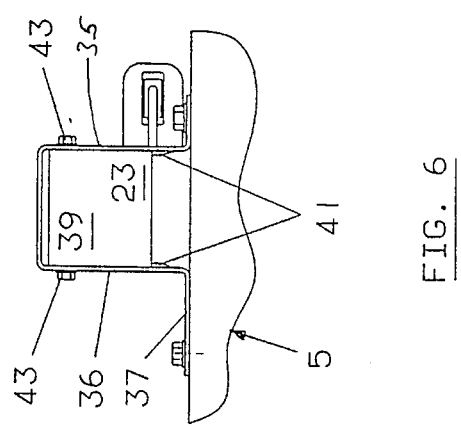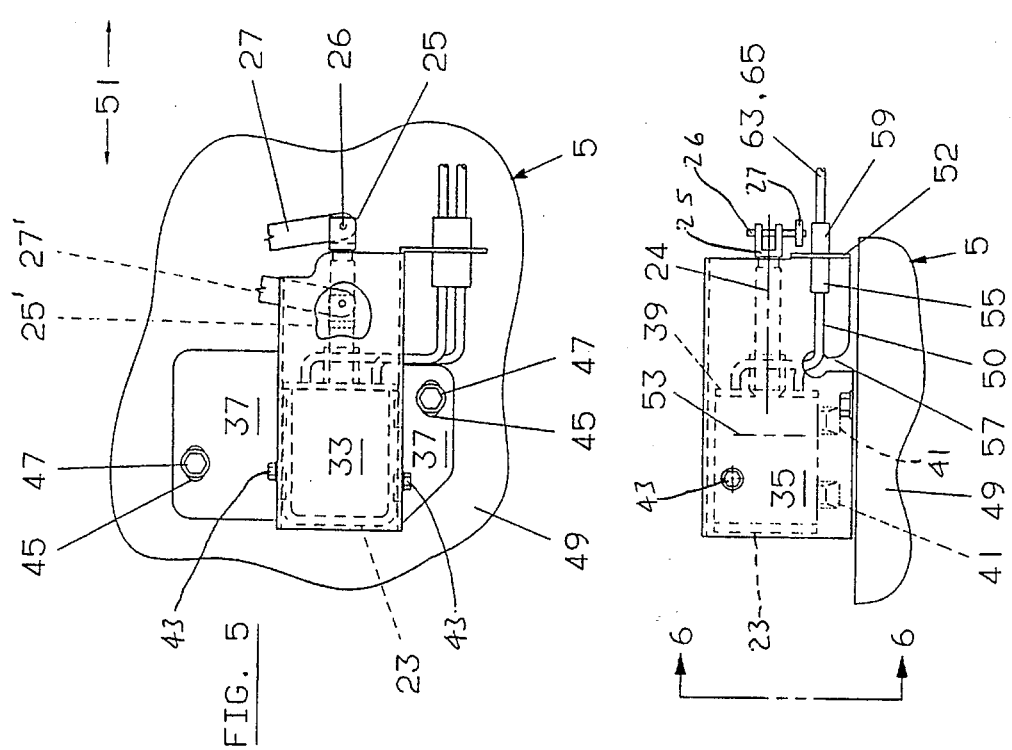

IDLE SOLENOID FOR ENGINE DRIVEN WELDER

BACKGROUND OF THE INVENTION

1. Field of the Invention

This invention pertains to controlling internal combustion engines, and more particularly to apparatus for changing engine speed in response to changes in welding power requirements.

2. Description of the Prior Art

Internal combustion engines are an integral part of self-contained welding machines. It is known to equip such welding machines with controls that vary the engine speed based on the instantaneous demand for welding power. While welding is occurring, the engine governor sets the engine at a predetermined operating speed. For economic and environmental reasons, the control sets the engine at a lower idle speed during intervals when no welding is taking place.

A popular engine speed control on prior self-contained welding machines included a solenoid having its plunger connected to a governor arm of the engine. During periods of welding, the governor maintained the engine operating speed, such as 3700 revolutions per minute. When the control sensed that no welding had occurred for a predetermined time, such as 12 seconds, the control operated the solenoid to position the governor arm to decrease the engine speed to an idle speed, such as 2200 revolutions per minute.

The prior engine speed control included a small housing that was stationarily fastened to a solid surface on the welding machine. Screws passing through horizontally oriented slots in the housing walls held the solenoid in place with its plunger horizontal. The plunger was pinned to the engine governor arm. The housing slots enabled the solenoid to be adjusted horizontally relative to the housing, thereby adjusting the position of the engine governor arm to the desired idle speed. When the solenoid was at the proper location relative to the engine, it was firmly tightened in place with the screws through the housing walls. The screws also held a slotted cover on the housing. The cover overhung the solenoid plunger.

Although the prior engine speed control for self-contained welding machines has been successful in operation, it nevertheless had the characteristic of being rather difficult to initially adjust. The slots in the housing walls that allowed linear adjustment of the solenoid relative to the housing also enabled the solenoid to tilt about a horizontal axis. If the solenoid tilted such that the plunger was not aligned horizontally, the pin between the plunger and the engine idle arm could bind. If the misalignment was severe, the end of the plunger could contact the engine governor arm and possibly cause improper engine operation.

The overhanging cover aggravated the adjustment problem. Since the cover was held to the housing by the same screws that held the solenoid, the cover was in place over the solenoid as the solenoid was adjusted. Consequently, it was difficult for a worker to see the solenoid and its plunger while he adjusted the solenoid. Further, it was a tricky task to hold and align both the solenoid and the cover while simultaneously tightening the screws. Moreover, even if the solenoid and cover were properly adjusted initially, vibrations and relocations of the machine during normal use could have a tendency to work the screws loose. In severe cases, the solenoid plunger and governor arm could then bind, or the cover could tilt until its overhanging end contacted the solenoid plunger.

Another disadvantage of the engine speed control of prior self-contained welding machines concerned the solenoid wiring. At the assembly of the welding machine, a first wire was connected between the machine control circuit and the solenoid, and a second wire was connected between the solenoid and a ground. However, at the state of machine assembly when the solenoid was wired, the only practical ground available was a painted surface on the machine frame.

SUMMARY OF THE INVENTION

In accordance with the present invention, an idle solenoid is provided that greatly improves the reliability and facilitates the assembly of the engine speed control of a self-contained welding machine. This is accomplished by apparatus that includes a solenoid secured immovably to a bracket that is limited to bidirectional movement relative to the engine.

The bracket has a top wall, two side walls, and a foot extending outwardly from each side wall. Shoulders on the side walls support the solenoid body and prevent it from tilting about a horizontal axis. Fasteners passing through the side walls secure the solenoid to the bracket. The bracket top wall overlies most of the solenoid plunger. There is a slot in each bracket foot. The slots have respective major axes parallel to the solenoid longitudinal axis.

The bracket feet are placed on a rigid surface of the engine proximate its governor arm. Screws passing through the slots in the feet loosely fasten the bracket to the engine. The solenoid plunger is pinned to the engine governor arm. The slots enable the bracket to slide in directions parallel to the solenoid longitudinal axis in a manner that adjusts the governor arm. With the solenoid plunger fully retracted, the bracket is adjusted such that the governor arm is at the position that produces the desired engine idle speed. Then the bracket screws are tightened. There is no possibility that the solenoid can tilt during assembly or during subsequent machine operation to cause potential interference between the plunger and the governor arm. Further, the bracket top wall cannot tilt to contact the solenoid plunger.

Further in accordance with the present invention, the solenoid is wired in a manner that is simpler and more reliable than previously. For that purpose, the bracket is fabricated with a tab that retains an electrical plug. Two wires from the plug pass through a cutout in a bracket wall to the solenoid. A circuit wire supplied as part of the machine control circuit terminates in a second plug that is mateable with the plug in the bracket. A ground wire from the second plug is grounded to a bare surface on the engine block during manufacture of the engine. At the assembly of the welding machine, it is necessary merely to connect the plug in the bracket tab to the plug from the machine control circuit.

The method and apparatus of the invention, using a bracket that permits only linear bidirectional motion of a solenoid relative to an internal combustion engine, thus facilitates initial adjustment of the engine idle speed of a self-contained welding machine. The possibility of interference or binding between the solenoid plunger and the engine governor arm, or between the bracket and the solenoid plunger, is eliminated, and the number of pieces and fasteners is reduced compared to prior engine idle speed adjustment devices.

Other advantages, benefits, and features of the present invention will become apparent to those skilled in the art upon reading the detailed description of the invention.

BRIEF DESCRIPTION OF THE DRAWINGS

FIG. 2 is a partial back view of the self-contained welding machine.

FIG. 3 is an enlarged, simplified, and partial view taken generally along line 3—3 of FIG. 2.

FIG. 4 is an enlarged view taken along line 4—4 of FIG. 3.

FIG. 5 is a partially broken top view of FIG. 4.

FIG. 6 is a view taken along line 6—6 of FIG. 4.

FIG. 7 is an electrical schematic view of the idle solenoid of the invention in combination with the machine control circuit.

DETAILED DESCRIPTION OF THE PREFERRED EMBODIMENTS

Figure 1:
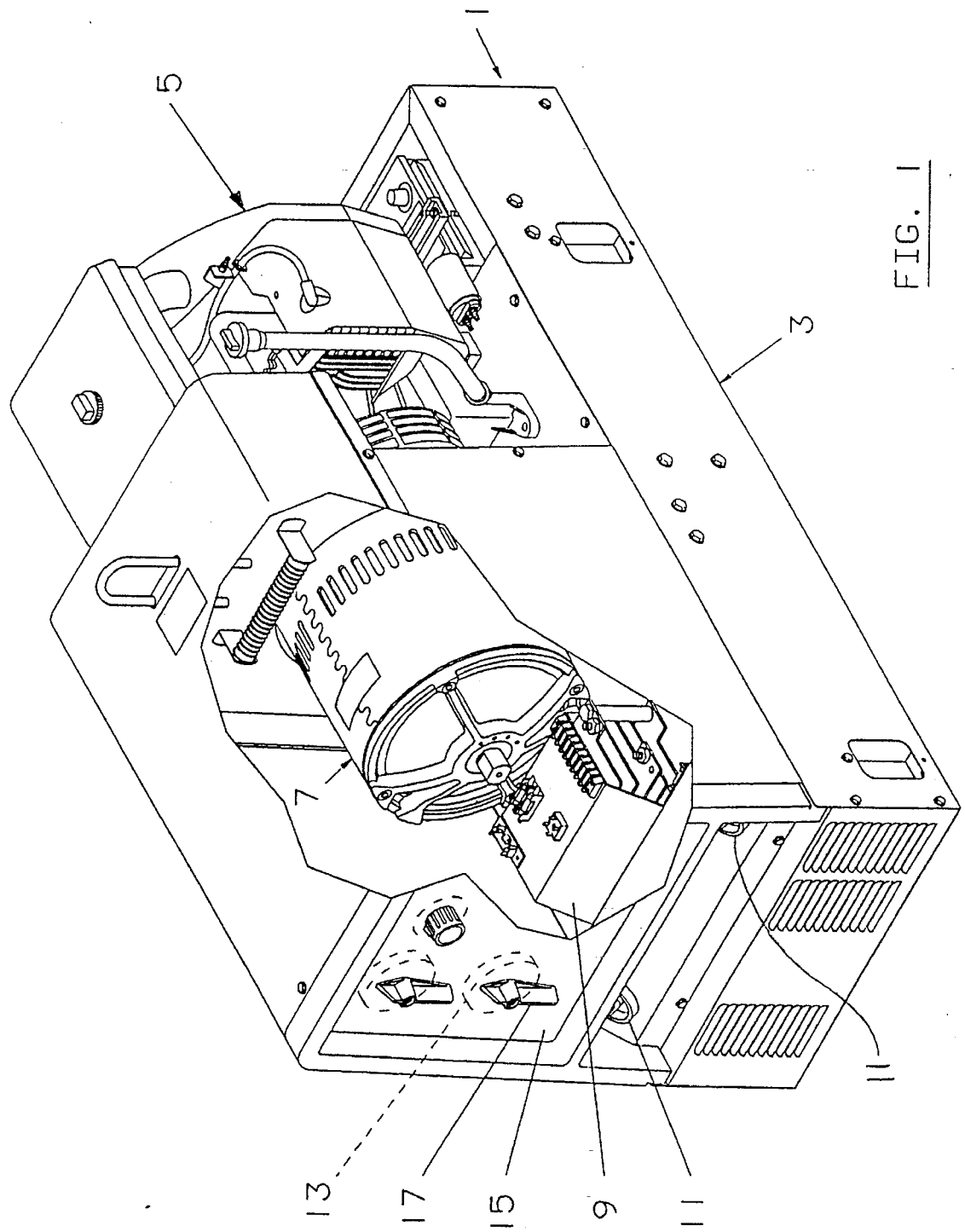
FIG. 1 is a partially broken front perspective view of a self-contained welding machine that makes use of the present invention.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIG. 1, a self-contained welding machine 1 is illustrated that advantageously utilizes the present invention. The self-contained welding machine 1 comprises a frame 3 that supports an internal combustion engine 5 and a generator 7. Electrical power produced by the generator 7 as it is rotated by the internal combustion engine 5 is converted by known electrical components 9 into useable welding power available at terminals 11. Welding cables, not shown, connect to the terminals 11. The welding cables supply welding power to a welding gun and a workpiece, as is known in the art.

An engine governor arm 29, FIG. 3, is an integral part of the internal combustion engine 5. The governor arm 29 is connected through various linkages and other mechanisms collectively indicated by reference numeral 30 to the engine throttle 31. The governor arm positions the throttle 31 to maintain a desired engine operating speed, as is known to those skilled in the art.

The self-contained welding machine 1 is controlled to a large extent by various control components 13 mounted to the inside of a control panel 15. Knobs and levers 17 on the outside of the control panel 15 adjust the welding machine to produce various desired operating conditions.

When actual welding of a workpiece is occurring, the engine 5 runs at an operating speed to produce the required welding power at the terminals 11. However, due to the sporadic nature of the welding process, there are times when the engine is running but no welding power is demanded from the terminals.

In accordance with the present invention, and looking at FIGS. 2–6, the speed of the internal combustion engine 5 during times when no welding is occurring is determined by a simple and reliable idle solenoid assembly 19. The idle solenoid assembly 19 comprises a bracket 21 and a solenoid 23. The solenoid 23 defines a longitudinal axis 24 and has a plunger 25. The free end of the plunger 25 is connected by a pin 26 to an extension 27 of the engine governor arm 29.

The solenoid 23 is actuated by a suitable idle control circuit 61, FIG. 7, that is a part of the control system of the self-contained welding machine 1. The idle control circuit 61, in conjunction with the electrical components 9, sense the demand for welding power at the terminals 11 and actuate the solenoid accordingly. During times when welding is taking place, the solenoid is deenergized. In that situation, the plunger 25 is free to float, and it does so as the governor arm 29 changes its position to maintain a constant engine operating speed. For example, the operating speed may be 3700 revolutions per minute when the solenoid plunger 25 is extended as shown in the solid lines of FIG. 5.

When the idle control circuit 61 senses no demand for welding power at the terminals 11, it starts a delay routine. If after a predetermined time, such as 12 seconds, no welding demand has been made, the circuit actuates the solenoid 23. The plunger retracts to a position as shown by phantom lines 25' in FIG. 5. The solenoid clamps the governor arm at a controlled location represented by the phantom lines of the extension 27'. With the governor arm clamped by the actuated solenoid, the engine speed drops to an idle speed, such as 2200 revolutions per minute.

To produce the desired idle speed of the internal combustion engine 5, it is necessary to accurately adjust the idle solenoid assembly 19 relative to the engine. Further, for production purposes, the adjustment of the idle solenoid assembly must be accomplished quickly and easily. To achieve those purposes, the bracket 21 is preferably fabricated from a single piece of material so as to have a top wall 33, two parallel side walls 35 and 36, and two outwardly extending feet 37. The bracket top wall 33 and side walls 35 and 36 are sized to receive the body 39 of the solenoid 23. The bracket side walls are each formed with at least one and preferably two shoulders 41 having respective flat upper surfaces on which the solenoid body 39 rests. A pair of fasteners 43 secure the solenoid body to the bracket side walls. The shoulders 41 and the fasteners 43 cooperate to secure the solenoid immovably to the bracket. That is, the solenoid cannot tilt about a horizontal axis relative to the bracket or to the engine governor arm 29. The bracket top wall 33 is long enough to cover most of the solenoid plunger 25. Each foot of the bracket 21 is formed with a slot 45. The slots 45 extend in directions parallel to the solenoid longitudinal axis 24. Screws 47 passing through the slots fasten the bracket to a suitable surface 49, such as a cowling, of the engine 5.

To adjust the idle solenoid assembly 19, the screws 47 are loosened. The bracket 21 can then be slid in the directions of arrow 51 on the surface 49. When the bracket is located such that the proper engine idle speed is obtained for the retracted position of the solenoid plunger 25, the screws are tightened. Final adjustment of the throttle 31 is made through a fine adjustment 54 in the linkage 30.

A major advantage of the bracket 21 of the invention is that it can rotate about any arbitrary vertical axis, such as axis 53, during the adjustment process, within the limits of the slots 45, without detrimental defect. Any rotation of the bracket is automatically compensated merely by minor linear adjustments in the directions of arrow 51. Further, the combination of the bracket shoulders 41 and the screws 43 prevent the solenoid 23 from tilting about a horizontal axis and thus causing binding between the plunger 25 and the governor arm 29. Consequently, interference with the free floating of the plunger during engine operation is eliminated.

It is a feature of the present invention that the solenoid 23 is quickly and properly electrically grounded to the engine 5. For that purpose, the bracket 21 is fabricated with a tab 52 projecting from the side wall 35. The tab 52 has an opening therethrough sized to retain an electrical plug 55. A cutout 57 in the bracket wall 35 enables the solenoid wires 50 to pass from the plug 55 to the solenoid body 39.

A first wire 63 is part of the machine idle control circuit 61. The first wire 63 leads from the control circuit 61 to a plug 59. A second wire 65 leads from the plug 59 to a machined surface of the engine, to which the wire is secured at engine manufacture to form a proper ground. By mating the plugs 55 and 59 at the assembly of the self-contained welding machine 1, the electrical connection of the solenoid 23 to the engine 5 is achieved as easily and quickly as the mechanical connection of the idle solenoid assembly 19 to the engine surface 49.

Thus, it is apparent that there has been provided, in accordance with the invention, an idle solenoid assembly that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. In a self-contained welding machine having a generator, an internal combustion engine that rotates the generator to produce electrical power, a control circuit, and electrical components for converting the electrical power to welding power, an idle solenoid assembly that sets an idle speed of the internal combustion engine in response to a lack of demand for welding power comprising:

a. a solenoid selectively actuated by the control circuit and having a body and a plunger and defining a longitudinal axis;

b. pin means for connecting the solenoid plunger to a governor arm of the internal combustion engine;

c. a bracket having a top wall, two side walls, and two feet extending outwardly from respective side walls, the side walls securing the solenoid body immovably therebetween with the top wall overhanging the solenoid body and a substantial portion of the plunger, each foot having a slot therethrough oriented in directions parallel to the solenoid longitudinal axis; and d. fastener means for releasably fastening the bracket feet to a surface of the internal combustion engine, so that the fastener means can be loosened and the bracket slid on the engine surface, and the fastener means can be tightened to fasten the bracket to the engine surface at a location that produces the predetermined engine idle speed upon actuation of the solenoid.

2. The idle solenoid assembly of claim 1 wherein the bracket is fabricated with shoulder means for supporting the solenoid body on the bracket side walls.

3. The idle solenoid assembly of claim 1 wherein:

a. the bracket is fabricated with a tab joined to and extending generally perpendicular from a selected side wall and a cutout in the selected side wall proximate the tab, the cutout extending from a free edge of the selected side wall;

b. an electrical plug is retained in the tab; and c. an electrical wire extends between the solenoid body and the electrical plug and passes through the cutout in the bracket selected side wall.

4. The idle solenoid assembly of claim 1 further comprising:

a. a first wire leading from the solenoid body to a first plug;

b. a second plug mated with the first plug;

c. a second wire leading from the second plug to the control circuit; and d. a third wire leading from the second plug to a ground on the internal combustion engine.

5. A self-contained welding machine comprising:

a. an internal combustion engine having a governor arm;

b. generator and electrical components driven by the internal combustion engine for producing welding power;

c. control means for sensing welding power demand; and d. idle solenoid means for positioning the engine governor arm to produce a selected idle speed of the internal combustion engine in response to the control means sensing a lack of welding power demand comprising:

i. bracket means for sliding on a surface of the internal combustion engine; said bracket means comprising:

a. a bracket having a top wall, a pair of side walls depending from the top wall, and a pair of feet extending outwardly from respective side walls, each foot having a slot therethrough; and b. fastener means passing through the bracket slots for fastening the bracket feet to the selected surface, the slots enabling the bracket to slide on the engine surface to a location such that actuation of the solenoid clamps the engine governor arm at the position thereof corresponding to the engine idle speed;

ii. a solenoid secured immovably to the bracket means and having a plunger connected to the engine governor arm; and iii. circuit means for cooperating with the control means to actuate the solenoid plunger and clamp the engine governor arm to the position corresponding to the selected engine idle speed in response to the control means sensing a lack of demand for welding power.

6. The self-contained welding machine of claim 5 wherein the bracket top wall overhangs substantially all of the solenoid plunger.

7. The self-contained welding machine of claim 5 wherein the bracket defines shoulder means for supporting the solenoid without tilting on the bracket side walls.

8. The self-contained welding machine of claim 7 wherein the circuit means comprises:

a. a solenoid wire terminating in a first plug retained in the bracket tab;

b. a first circuit wire leading from the control means to a second plug that mates with the first plug; and c. a ground wire that leads from the second plug to a ground on the internal combustion engine.

9. The self-contained welding machine of claim 5 wherein the bracket is fabricated with a tab extending from a selected side wall and with a cutout in the selected side wall proximate the tab.

\* \* \* \* \*